(12) United States Patent
Ueda

(10) Patent No.: US 10,998,809 B2
(45) Date of Patent: May 4, 2021

(54) POWER CONVERSION APPARATUS

(71) Applicant: SHARP KABUSHIKI KAISHA, Sakai (JP)

(72) Inventor: Masaya Ueda, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 226 days.

(21) Appl. No.: 16/164,499

(22) Filed: Oct. 18, 2018

(65) Prior Publication Data

US 2019/0115822 A1    Apr. 18, 2019

(30) Foreign Application Priority Data

Oct. 18, 2017 (JP) .............................. JP2017-201628

(51) Int. Cl.
| | |
|---|---|
| *H02M 1/08* | (2006.01) |
| *H02M 3/335* | (2006.01) |
| *H02M 7/5387* | (2007.01) |
| *H02M 3/337* | (2006.01) |
| *H02P 27/08* | (2006.01) |
| *H02M 7/00* | (2006.01) |

(52) U.S. Cl.
CPC ............ *H02M 1/08* (2013.01); *H02M 3/337* (2013.01); *H02M 3/33584* (2013.01); *H02M 7/53871* (2013.01); *H02M 7/003* (2013.01); *H02P 27/08* (2013.01)

(58) Field of Classification Search
CPC .... H02M 1/08; H02M 3/33584; H02M 3/337; H02M 7/53871; H02M 7/003; H02M 3/3353; H02M 7/5387; H02P 27/08

USPC .......................................................... 307/82
See application file for complete search history.

(56) References Cited

U.S. PATENT DOCUMENTS

| | | | |
|---|---|---|---|
| 2016/0020702 A1* | 1/2016 | Trescases | H02M 3/33592 363/17 |
| 2016/0261178 A1 | 9/2016 | Sato et al. | |
| 2016/0280082 A1* | 9/2016 | Tajima | H02J 7/02 |

FOREIGN PATENT DOCUMENTS

| | | |
|---|---|---|
| CN | 202425206 U | 9/2012 |
| CN | 104348398 A | 2/2015 |
| CN | 204538950 U | 8/2015 |
| JP | 6164667 B2 | 7/2017 |

* cited by examiner

*Primary Examiner* — Toan T Vu

(74) *Attorney, Agent, or Firm* — ScienBiziP, P.C.

(57) ABSTRACT

A power conversion apparatus includes a power conversion circuit portion which includes a plurality of semiconductor switching elements, a control signal generation portion which generates a control signal for controlling opening and closing of each of the semiconductor switching elements, a plurality of driving portions which drive the semiconductor switching elements, and a first board on which the power conversion circuit portion and the plurality of driving portions are mounted. Each of the driving portions includes a power supply portion which converts AC power-supply power input from outside the first board into DC power-supply power, and a driving signal generation portion which generates a driving signal for driving the semiconductor switching elements from the DC power-supply power in accordance with the control signal.

7 Claims, 4 Drawing Sheets

POWER CONVERSION APPARATUS

BACKGROUND

1. Field

The present disclosure relates to a power conversion apparatus.

2. Description of the Related Art

In a power conversion apparatus used in a converter, a power supply of a motor, or the like, a plurality of switching elements are driven by a gate driver.

Japanese Patent No. 6164667 as an example of a conventional technique associated with the present disclosure discloses a multilevel power conversion circuit in which a plurality of unit modules, each composed of a principal circuit and a gate driving circuit, for a power conversion circuit are connected. In the multilevel power conversion circuit, combinations of a plurality of unit modules can be varied in accordance with a power-supply-side configuration and a load-side configuration.

In the design of a plurality of power supply circuits which supply power-supply power of direct current to respective gate drivers, a power conversion apparatus for a larger amount of power has a greater need to provide sufficient galvanic isolation between the power supply circuits to ensure safety. However, an increase in a separation distance between power supply circuits causes an increase in a board area for mounting power supply circuits apart from each other, which makes miniaturization of power conversion apparatuses difficult and increases the manufacturing cost. It is thus difficult to increase a separation distance between power supply circuits. Note that the problem is not mentioned in Japanese Patent No. 6164667.

In view of the above-described circumstances, it is desirable to provide a power conversion apparatus capable of easily securing a separation distance sufficient to achieve good electrical isolation between power supply portions while curbing an increase in board area.

SUMMARY

According to an aspect of the disclosure, there is provided a power conversion apparatus including a power conversion circuit portion which includes a plurality of semiconductor switching elements, a control signal generation portion which generates a control signal for controlling opening and closing of each of the semiconductor switching elements, a plurality of driving portions which drive the semiconductor switching elements, and a first board on which the power conversion circuit portion and the plurality of driving portions are mounted. Each of the driving portions includes a power supply portion which converts AC power-supply power input from outside the first board into DC power-supply power, and a driving signal generation portion which generates a driving signal for driving the semiconductor switching element from the DC power-supply power in accordance with the control signal.

DESCRIPTION OF THE EMBODIMENTS

Embodiments of the present disclosure will be described below with reference to the drawings.

First Embodiment

Figure 1:
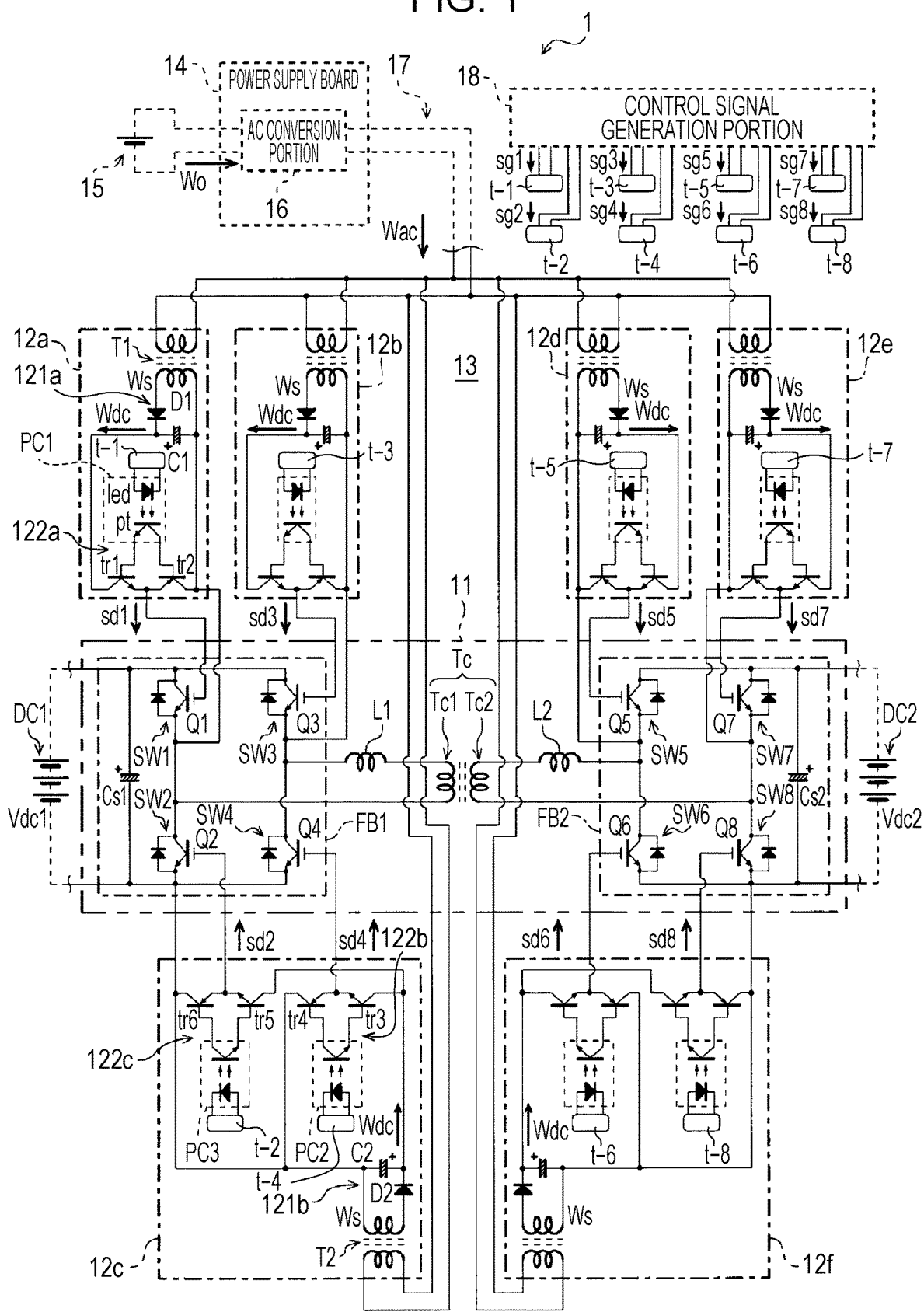
FIG. 1 shows a circuit which is mounted on a power control board of a power conversion apparatus according to a first embodiment.

FIG. 1 shows a circuit which is mounted on a power control board 13 of a power conversion apparatus 1 according to a first embodiment. Note that electrical connections of constituent elements arranged outside the power control board 13 are indicated by broken lines in FIG. 1.

The power conversion apparatus 1 is a dual-active-bridge (DAB) bidirectional DC-DC converter in which full-bridge circuits FB1 and FB2 are arranged to be bilaterally symmetric with respect to an isolation transformer Tc. The power conversion apparatus 1 is provided between two DC power supplies DC1 and DC2 and transmits power between the DC power supplies DC1 and DC2 in two directions.

As shown in FIG. 1, the power conversion apparatus 1 includes a power conversion circuit portion 11, a plurality of gate driving portions 12a to 12f, the power control board 13, a power supply board 14, a DC power source 15, an AC conversion portion 16, transmission lines 17, and a control signal generation portion 18. The power control board 13 has the power conversion circuit portion 11 and the six gate driving portions 12a to 12f mounted thereon. The power supply board 14 has the AC conversion portion 16 mounted thereon. The transmission lines 17 are provided between the power control board 13 and the power supply board 14. Note that, in FIG. 1, connection ends t-1 to t-8 of the control signal generation portion 18 are respectively connected to connection ends t-1 to t-8 of light-emitting elements led of photocouplers PC1 to PC3 in the gate driving portions 12a to 12f. In the first embodiment, the gate driving portions 12a to 12f are each an example of a "driving portion" of the present disclosure.

The power conversion circuit portion 11 is connected to the two DC power supplies DC1 and DC2 and performs power conversion between the DC power supplies DC1 and DC2. For example, the power conversion circuit portion 11 converts a voltage of DC power in accordance with gate driving signals sd1 to sd8 output from the gate driving portions 12a to 12f. More specifically, the power conversion circuit portion 11 converts a voltage of DC power output from the DC power supply DC1 and outputs the DC power to the DC power supply DC2, or converts a voltage of DC power output from the DC power supply DC2 and outputs the DC power to the DC power supply DC1.

The power conversion circuit portion 11 includes the two full-bridge circuits FB1 and FB2, the isolation transformer Tc, and two inductors L1 and L2. The power conversion circuit portion 11 also includes eight semiconductor switching elements Q1 to Q8, as shown in FIG. 1.

One end of the full-bridge circuit FB1 is connected to the DC power supply DC1, and the other end is connected to a one-side winding Tc1 of the isolation transformer Tc. One end of the full-bridge circuit FB2 is connected to an other-side winding Tc2 of the isolation transformer Tc, and the other end is connected to the DC power supply DC2.

The full-bridge circuit FB1 is composed of the four semiconductor switching elements Q1 to Q4, to which respective flyback diodes are connected, and a capacitor Cs1. Of the semiconductor switching elements Q1 to Q4, the semiconductor switching elements Q1 and Q3 are driven by the separate gate driving portions 12a and 12b, and the semiconductor switching elements Q2 and Q4 are driven by the same gate driving portion 12c. Note that the present disclosure is not limited to the example in FIG. 1 and that the semiconductor switching elements Q2 and Q4 may be driven by different gate driving portions. The two semiconductor switching elements Q1 and Q2 are connected in series, and the two semiconductor switching elements Q3 and Q4 are connected in series. The two semiconductor switching elements Q1 and Q2 connected in series and the two semiconductor switching elements Q3 and Q4 connected in series are connected in parallel with the DC power supply DC1, the capacitor Cs1, and the one-side winding Tc1 of the isolation transformer Tc. More specifically, one end of the DC power supply DC1 and a high-potential-side terminal of the capacitor Cs1 are connected between the semiconductor switching elements Q1 and Q3. The other end of the DC power supply DC1 and a low-potential-side terminal of the capacitor Cs1 are connected between the semiconductor switching elements Q2 and Q4. One end of the one-side winding Tc1 of the isolation transformer Tc is connected between the semiconductor switching elements Q3 and Q4 via the inductor L1. The other end of the one-side winding Tc1 of the isolation transformer Tc is connected between the semiconductor switching elements Q1 and Q2.

The full-bridge circuit FB2 is composed of the four semiconductor switching elements Q5 to Q8, to which respective flyback diodes are connected, and a capacitor Cs2. Of the semiconductor switching elements Q5 to Q8, the semiconductor switching elements Q5 and Q7 are driven by the separate gate driving portions 12d and 12e, and the semiconductor switching elements Q6 and Q8 are driven by the same gate driving portion 12f. Note that the present disclosure is not limited to the example in FIG. 1 and that the semiconductor switching elements Q6 and Q8 may be driven by different gate driving portions. The two semiconductor switching elements Q5 and Q6 are connected in series, and the two semiconductor switching elements Q7 and Q8 are connected in series. The two semiconductor switching elements Q5 and Q6 connected in series and the two semiconductor switching elements Q7 and Q8 connected in series are connected in parallel with the DC power supply DC2, the capacitor Cs2, and the other-side winding Tc2 of the isolation transformer Tc. More specifically, one end of the DC power supply DC2 and a high-potential-side terminal of the capacitor Cs2 are connected between the semiconductor switching elements Q5 and Q7. The other end of the DC power supply DC2 and a low-potential-side terminal of the capacitor Cs2 are connected between the semiconductor switching elements Q6 and Q8. One end of the other-side winding Tc2 of the isolation transformer Tc is connected between the semiconductor switching elements Q5 and Q6 via the inductor L2. The other end of the other-side winding Tc2 of the isolation transformer Tc is connected between the semiconductor switching elements Q7 and Q8.

The semiconductor switching elements Q1 to Q8 together with the flyback diodes connected in parallel constitute switch portions SW1 to SW8, respectively. The semiconductor switching elements Q1 to Q8 are each, for example, an insulated gate bipolar transistor (IGBT). In the switch portions SW1 to SW8, anodes of the flyback diodes are connected to drains of the semiconductor switching elements Q1 to Q8, and cathodes of the flyback diodes are connected to sources of the semiconductor switching elements Q1 to Q8.

The gate driving portions 12a to 12f are connected to gates of the semiconductor switching elements Q1 to Q8, and the gate driving signals sd1 to sd8 are output from the gate driving portions 12a to 12f. Turning-on and turning-off (that is, opening and closing operation) of the semiconductor switching elements Q1 to Q8 is controlled in accordance with the gate driving signals sd1 to sd8. For example, the semiconductor switching elements Q1 to Q8 are on (that is, opening operation) if voltages of the gate driving signals sd1 to sd8 are at high level and are off (that is, closing operation) if the voltages of the gate driving signals sd1 to sd8 are at low level (for example, 0 V).

The gate driving portions 12a to 12f then drive the semiconductor switching elements Q1 to Q8 with the respective gate driving signals sd1 to sd8. The gate driving portions 12a, 12b, 12d, and 12e each include a gate power supply circuit portion 121a and a gate driver 122a. The gate driving portions 12c and 12f each include a gate power supply circuit portion 121b and two gate drivers 122b and 122c. Note that, in the first embodiment, the gate power supply circuit portions 121a and 121b are each an example of a "power supply portion" of the present disclosure and that the gate drivers 122a, 122b, and 122c are each an example of a "driving signal generation portion" of the present disclosure.

The gate power supply circuit portions 121a and 121b are isolated power supplies which supply, to the gate drivers 122a to 122c, DC power-supply power Wdc for generating the gate driving signals sd1 to sd8. AC power-supply power Wac is input from outside the power control board 13 to the gate power supply circuit portions 121a and 121b. The gate power supply circuit portions 121a and 121b convert the AC power-supply power Wac into the DC power-supply power Wdc. The gate power supply circuit portions 121a then output the DC power-supply power Wdc to the gate drivers 122a, and the gate power supply circuit portions 121b output the DC power-supply power Wdc to the gate drivers 122b and 122c.

In the above-described manner, the AC power-supply power Wac for generating the gate driving signals sd1 to sd8 is input from outside the power control board 13 to the gate power supply circuit portions 121a and 121b of the gate driving portions 12a to 12f and is converted into the DC power-supply power Wdc in the vicinity of the semiconductor switching elements Q1 to Q8. It is thus possible to easily secure separation distances sufficient to achieve good electrical isolation, such as galvanic isolation, between the gate power supply circuit portions 121a and 121b in the gate driving portions 12a to 12f while curbing an increase in a board area of the power control board 13. Note that the term galvanic isolation refers to an electrically isolated state in which no current flows between one end and the other end. The separation distances between the gate power supply circuit portions 121a and 121b in the gate driving portions 12a to 12f can be shortened, which allows miniaturization of the power conversion apparatus 1.

Since the gate driving portions 12a to 12f and the power conversion circuit portion 11 are mounted on the same power control board 13, output signal lines of the gate driving portions 12a to 12f need not be connected to the power conversion circuit portion 11 using, for example, a harness in which connecting lines are closely bound. Accordingly, sufficient separation distances can be easily secured between the output signal lines of the gate driving portions 12a to 12f. It is thus possible to inhibit or keep output signals from the gate driving portions 12a to 12f from interfering with one another.

The gate power supply circuit portions 121a and 121b include isolation transformers T1 and T2, diodes D1 and D2, and capacitors C1 and C2, respectively. The AC power-supply power Wac is input to primary-side terminals of the isolation transformers T1 and T2. Secondary-side power Ws based on the AC power-supply power Wac is generated at secondary-side terminals of the isolation transformers T1 and T2. The gate power supply circuit portions 121a and 121b convert the secondary-side power Ws output from the secondary-side terminals of the isolation transformers T1 and T2 into the DC power-supply power Wdc of direct current with the diodes D1 and D2 and the capacitors C1 and C2, respectively. Since the gate power supply circuit portions 121a and 121b include the isolation transformers T1 and T2, an input end and an output end of the gate power supply circuit portion 121a or 121b in each of the gate driving portions 12a to 12f can be isolated from each other.

The gate drivers 122a to 122c include the photocouplers PC1 to PC3 and transistor elements tr1 and tr2, tr3 and tr4, and tr5 and tr6, respectively. The gate drivers 122a to 122c generate the gate driving signals sd1 to sd8 from the DC power-supply power Wdc in accordance with control signals sg1 to sg8 (to be described later) output from the control signal generation portion 18.

The gate driving portions 12a, 12b, 12d, and 12e have same configurations. In the gate power supply circuit portion 121a of each of the gate driving portions 12a, 12b, 12d, and 12e, the primary-side terminal of the isolation transformer T1 is connected to the transmission lines 17. One end of the secondary-side terminal of the isolation transformer T1 is connected to an anode of the diode D1. A cathode of the diode D1 is connected to a high-potential-side terminal of the capacitor C1 and a collector of the transistor element tr1. The other end of the secondary-side terminal of the isolation transformer T1 is connected to a low-potential-side terminal of the capacitor C1 and an emitter of the transistor element tr2 and is further connected to the power conversion circuit portion 11. Note that, more specifically, the other end is connected between the semiconductor switching elements Q1 and Q2 in the gate driving portion 12a, the other end is connected between the semiconductor switching elements Q3 and Q4 in the gate driving portion 12b, the other end is connected between the semiconductor switching elements Q5 and Q6 in the gate driving portion 12d, and the other end is connected between the semiconductor switching elements Q7 and Q8 in the gate driving portion 12e. Each photocoupler PC1 that is composed of the light-emitting element led and a light-receiving element pt is connected to bases of the transistor elements tr1 and tr2. Emitters of the transistor elements tr1 are connected to collectors of the transistor elements tr2, and the gates of the semiconductor switching elements Q1, Q3, Q5, and Q7. In the gate drivers 122a of the gate driving portions 12a, 12b, 12d, and 12e, the control signals sg1, sg3, sg5, and sg7 are input from the control signal generation portion 18 to the light-emitting elements led of the photocouplers PC1 via the connection ends t-1, t-3, t-5, and t-7. The light-emitting elements led are driven to emit light during a period when the semiconductor switching elements Q1, Q3, Q5, and Q7 are on and are stopped from emitting light during a period when the semiconductor switching elements Q1, Q3, Q5, and Q7 are off, in accordance with the control signals sg1, sg3, sg5, and sg7. With this configuration, the gate driving signals sd1, sd3, sd5, and sd7 of direct current are generated from the secondary-side power Ws of alternating current, and the gate driving signals sd1, sd3, sd5, and sd7 are output to the gates of the semiconductor switching elements Q1, Q3, Q5, and Q7.

The gate driving portions 12c and 12f have same configurations. In each of the gate driving portions 12c and 12f, the primary-side terminal of the isolation transformer T2 is connected to the transmission lines 17. One end of the secondary-side terminal of the isolation transformer T2 is connected to an anode of the diode D2. A cathode of the diode D2 is connected to a high-potential-side terminal of the capacitor C2 and collectors of the transistor elements tr3 and tr5. The other end of the secondary-side terminal of the isolation transformer T2 is connected to a low-potential-side terminal of the capacitor C2 and emitters of the transistor elements tr4 and tr6 and is further connected to the power conversion circuit portion 11. Note that, more specifically, the other end is connected between the semiconductor switching elements Q2 and Q4 in the gate driving portion 12c and the other end is connected between the semiconductor switching elements Q6 and Q8 in the gate driving portion 12f. Each photocoupler PC2 is connected to bases of the transistor elements tr3 and tr4, and each photocoupler PC3 is connected to bases of the transistor elements tr5 and tr6. Emitters of the transistor elements tr3 are connected to collectors of the transistor elements tr4 and the gates of the semiconductor switching elements Q4 and Q6. Emitters of the transistor elements tr5 are connected to collectors of the transistor elements tr6 and the gates of the semiconductor switching elements Q2 and Q8. In the gate drivers 122b of the gate driving portions 12c and 12f, the control signals sg4 and sg6 are input from the control signal generation portion 18 to the light-emitting elements led of the photocouplers PC2 via the connection ends t-4 and t-6. In the photocouplers PC2, the light-emitting elements led are driven to emit light during a period when the semiconductor switching element Q4 and Q6 are on and are stopped from emitting light during a period when the semiconductor switching elements Q4 and Q6 are off, in accordance with the control signals sg4 and sg6. With this configuration, the gate driving signals sd4 and sd6 of direct current are generated from the secondary-side power Ws of alternating current, and the gate driving signals sd4 and sd6 are output to the gates of the semiconductor switching elements Q4 and Q6. Similarly, in the gate drivers 122c of the gate driving portions 12c and 12f, the light-emitting elements led of the photocouplers PC3 are driven to emit light during a period when the semiconductor switching elements Q2 and Q8 are on and are stopped from emitting light during a period when the semiconductor switching elements Q2 and Q8 are off, in accordance with the control signals sg2 and sg8 that are input from the control signal generation portion 18 via the connection ends t-2 and t-8. With this configuration, the gate driving signals sd2 and sd8 of direct current that are generated from the secondary-side power Ws of alternating current are output to the gates of the semiconductor switching elements Q2 and Q8.

The DC power source 15 outputs output power Wo of direct current. The DC power source 15 is arranged outside the power control board 13. Although the DC power source 15 is provided at the power conversion apparatus 1 in FIG.

1, the present disclosure is not limited to the example. The DC power source 15 may be provided outside the power conversion apparatus 1.

The AC conversion portion 16 converts the output power Wo of direct current into the AC power-supply power Wac and outputs the AC power-supply power Wac to the transmission lines 17.

The transmission lines 17 transmit the AC power-supply power Wac from the power supply board 14 to the power control board 13. The number of transmission lines 17 that are provided between the power control board 13 and the power supply board 14 is two in FIG. 1. This configuration makes it possible to make the number of transmission lines 17 provided between the power control board 13 and the power supply board 14 smaller than in a case where the transmission lines 17 transmit DC power. The configuration also makes it easier to increase or decrease the number of gate driving portions 12a to 12f in accordance with the configuration of the power conversion circuit portion 11, and the like.

The control signal generation portion 18 generates the control signals sg1 to sg8 for controlling turning-on and turning-off of the semiconductor switching elements Q1 to Q8. The control signal generation portion 18 outputs the control signals sg1 to sg8 to the photocouplers PC1 to PC3 of the gate drivers 122a to 122c in the gate driving portions 12a to 12f via the connection ends t-1 to t-8. Note that although the control signal generation portion 18 is provided at the power conversion apparatus 1 in FIG. 1, the present disclosure is not limited to the example. The control signal generation portion 18 may be provided outside the power conversion apparatus 1.

Figure 2:
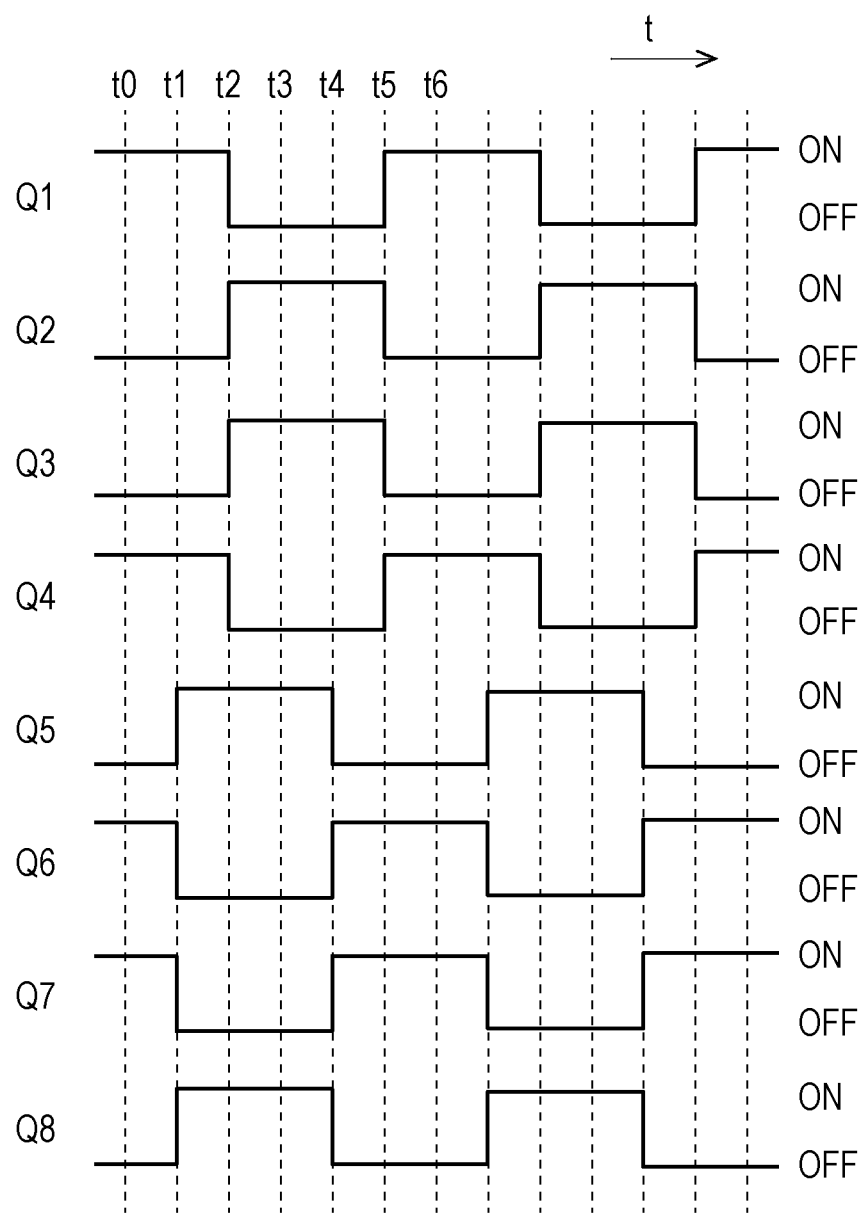
FIG. 2 is a timing diagram of opening and closing of semiconductor switching elements according to the first embodiment.

An example of operation of the power conversion circuit portion 11 will next be described. FIG. 2 is a timing diagram of opening and closing of the semiconductor switching elements Q1 to Q8 according to the first embodiment. Note that FIG. 2 illustrates an operation in the case of converting a voltage Vdc1 of output power from the DC power supply DC1 into a voltage Vdc2 and outputting the voltage-converted power to the DC power supply DC2. In FIG. 2, a dead time at each of time points t1 to t6 is omitted.

From a time point t0 to the time point t1, the semiconductor switching elements Q1, Q4, Q6, and Q7 are on, and the semiconductor switching elements Q2, Q3, Q5, and Q8 are off. At this time, in the full-bridge circuit FB1, a current flows from the one end of the DC power supply DC1 to the switch portion SW1, then to the one-side winding Tc1 of the isolation transformer Tc, then to the inductor L1, then to the switch portion SW4, and then to the other end of the DC power supply DC1. At the other-side winding Tc2 of the isolation transformer Tc, a secondary current corresponding to the current flowing through the one-side winding Tc1 is generated. The secondary current flows from the other end of the other-side winding Tc2 to the one end of the other-side winding Tc2 via the switch portion SW7, the DC power supply DC2, the switch portion SW6, and the inductor L2.

From the time point t1 to the time point t2, the semiconductor switching elements Q1, Q4, Q5, and Q8 are on, and the semiconductor switching elements Q2, Q3, Q6, and Q7 are off. At this time, in the full-bridge circuit FB1, a current flows from the one end of the DC power supply DC1 to the other end of the DC power supply DC1 via the switch portion SW1, the one-side winding Tc1 of the isolation transformer Tc, the inductor L1, and the switch portion SW4. A secondary current generated at the other-side winding Tc2 of the isolation transformer Tc flows from the other end of the other-side winding Tc2 to the one end of the other-side winding Tc2 via the switch portion SW8, the DC power supply DC2, the switch portion SW5, and the inductor L2.

From the time point t2 to the time point t4, the semiconductor switching elements Q2, Q3, Q5, and Q8 are on, and the semiconductor switching elements Q1, Q4, Q6, and Q7 are off. At this time, from the time point t2 to the time point t3, a direction of current flowing through the inductor L1 is kept the same as that from the time point t1 to the time point t2 due to a self-induction effect of the inductor L1. For this reason, in the full-bridge circuit FB1, a current flows from the other end of the DC power supply DC1 to the one end of the DC power supply DC1 via the switch portion SW2, the one-side winding Tc1 of the isolation transformer Tc, the inductor L1, and the switch portion SW3. A secondary current generated at the other-side winding Tc2 of the isolation transformer Tc flows from the one end of the other-side winding Tc2 to the other end of the other-side winding Tc2 via the inductor L2, the switch portion SW5, the DC power supply DC2, and the switch portion SW8.

Note that the direction of current flowing through the inductor L1 is reversed by a voltage in a negative direction applied to the inductor L1 at the time point t3. For this reason, from the time point t3 to the time point t4, in the full-bridge circuit FB1, a current flows from the one end of the DC power supply DC1 to the other end of the DC power supply DC1 via the switch portion SW3, the inductor L1, the one-side winding Tc1 of the isolation transformer Tc, and the switch portion SW2. A secondary current generated at the other-side winding Tc2 of the isolation transformer Tc flows from the other end of the other-side winding Tc2 to the one end of the other-side winding Tc2 via the switch portion SW8, the DC power supply DC2, the switch portion SW5, and the inductor L2.

From the time point t4 to the time point t5, the semiconductor switching elements Q2, Q3, Q6, and Q7 are on, and the semiconductor switching elements Q1, Q4, Q5, and Q8 are off. At this time, in the full-bridge circuit FB1, a current flows from the one end of the DC power supply DC1 to the other end of the DC power supply DC1 via the switch portion SW3, the inductor L1, the one-side winding Tc1 of the isolation transformer Tc, and the switch portion SW2, like from the time point t3 to the time point t4. A secondary current generated at the other-side winding Tc2 of the isolation transformer Tc flows from the other end of the other-side winding Tc2 to the one end of the other-side winding Tc2 via the switch portion SW7, the DC power supply DC2, the switch portion SW6, and the inductor L2.

From the time point t5 to the time point t6, the semiconductor switching elements Q1, Q4, Q6, and Q7 are on, and the semiconductor switching elements Q2, Q3, Q5, and Q8 are off. At this time, in the full-bridge circuit FB1, a current flows from the other end of the DC power supply DC1 to the one end of the DC power supply DC1 via the switch portion SW4, the inductor L1, the one-side winding Tc1 of the isolation transformer Tc, and the switch portion SW1. A secondary current generated at the other-side winding Tc2 of the isolation transformer Tc flows from the other end of the other-side winding Tc2 to the one end of the other-side winding Tc2 via the switch portion SW7, the DC power supply DC2, the switch portion SW6, and the inductor L2, like from the time point t4 to the time point t5.

At and after the time point t6, a switching operation from the time point t0 to the time point t6 is repeated.

According to the present embodiment described above, the power conversion apparatus 1 is configured to include the power conversion circuit portion 11 that includes the plurality of semiconductor switching elements Q1 to Q8, the control signal generation portion 18 that generates the control signals sg1 to sg8 for controlling opening and closing (turning-on and turning-off) of the semiconductor switching elements Q1 to Q8, the plurality of driving portions 12a to 12f that drive the semiconductor switching elements Q1 to Q8, and the first board 13 on which the power conversion circuit portion 11 and the plurality of driving portions 12a to 12f are mounted, and configured such that the driving portions 12a to 12f include the power supply portions 121a and 121b that convert the AC power-supply power Wac input from outside the first board 13 into the DC power-supply power Wdc and the driving signal generation portions 122a to 122c that generate the driving signals sd1 to sd8 for driving the semiconductor switching elements Q1 to Q8 from the DC power-supply power Wdc in accordance with the control signals sg1 to sg8.

According to the above-described configuration, the AC power-supply power Wac for generating the driving signals sd1 to sd8 is input from outside the first board 13 to the power supply portions 121a and 121b of the driving portions 12a to 12f and is converted into the DC power-supply power Wdc in the vicinity of the semiconductor switching elements Q1 to Q8. It is thus possible to easily secure separation distances sufficient to achieve good electrical isolation, such as galvanic isolation, between the power supply portions 121a and 121b of the driving portions 12a to 12f while curbing an increase in the board area of the first board 13.

The separation distances between the power supply portions 121a and 121b of the driving portions 12a to 12f can be made shorter than in a case where power-supply power of direct current is input from outside the first board 13 to the driving portions 12a to 12f, which allows miniaturization of the power conversion apparatus 1.

Additionally, since the driving portions 12a to 12f and the power conversion circuit portion 11 are mounted on the same first board 13, the output signal lines of the driving portions 12a to 12f need not be connected to the power conversion circuit portion 11 using, for example, a harness in which connecting lines are closely bound. Accordingly, sufficient separation distances can be easily secured between the output signal lines of the driving portions 12a to 12f. It is thus possible to inhibit or keep output signals from the driving portions 12a to 12f from interfering with one another.

According to the present embodiment, the power conversion apparatus 1 may be configured such that the power supply portions 121a and 121b in the driving portions 12a to 12f include the first isolation transformers T1 and T2 that receive the AC power-supply power Wac input to the primary-side terminals and convert the secondary-side power Ws output from the secondary-side terminals of the first isolation transformers T1 and T2 into the DC power-supply power Wdc of direct current. With this configuration, the first isolation transformers T1 and T2 allow isolation between the input end and the output end of the power supply portion 121a or 121b in each of the driving portions 12a to 12f.

Also, according to the present embodiment, the power conversion apparatus 1 may be configured to further include the AC conversion portion 16 that converts the output power Wo from the DC power source 15 into the AC power-supply power Wac and the second board 14 on which the AC conversion portion 16 is mounted. This configuration allows the AC power-supply power Wac, into which the output power Wo from the DC power source 15 is converted, to be input to the driving portions 12a to 12f.

Additionally, according to the present embodiment, the power conversion apparatus 1 may be configured to further include the transmission lines 17 that transmit the AC power-supply power Wac and configured such that the number of transmission lines 17 provided between the first board 13 and the second board 14 is two. This configuration makes possible to make the number of transmission lines 17 provided between the first board 13 and the second board 14 smaller than in a case where the transmission lines 17 transmit DC power. The configuration also makes it easier to increase or decrease the number of driving portions 12a to 12f in accordance with the configuration of the power conversion circuit portion 11.

Moreover, according to the present embodiment, the power conversion apparatus 1 may be the power conversion apparatus 1 that transmits power between the first DC power supply DC1 and the second DC power supply DC2 in two directions. The power conversion apparatus 1 may be configured such that the plurality of semiconductor switching elements Q1 to Q8 include the plurality of first semiconductor switching elements Q1 to Q4 and the plurality of second semiconductor switching elements Q5 to Q8, the power conversion circuit portion 11 includes the first full-bridge circuit FB1 including the plurality of first semiconductor switching elements Q1 to Q4 and the first capacitor Cs1, the second full-bridge circuit FB2 including the plurality of second semiconductor switching elements Q5 to Q8 and the second capacitor Cs2, and the second isolation transformer Tc, the first full-bridge circuit FB1 has the one end connected to the first DC power supply DC1 and the other end connected to the one-side winding Tc1 of the second isolation transformer Tc, and the second full-bridge circuit FB2 has the one end connected to the other-side winding Tc2 of the second isolation transformer Tc and the other end connected to the second DC power supply DC2. With this configuration, the power conversion apparatus 1, in which the first and second full-bridge circuits FB1 and FB2 are connected to be bilaterally symmetric with respect to the second isolation transformer Tc can be provided as a dual-active-bridge (DAB) bidirectional DC-DC converter.

Furthermore, according to the present embodiment, the power conversion apparatus 1 may be configured such that the plurality of first semiconductor switching elements Q1 to Q4 include the two semiconductor switching elements Q1 and Q3 that are driven by the separate driving portions 12a and 12b and the two semiconductor switching elements Q2 and Q4 that are driven by the same driving portion 12c, and the plurality of second semiconductor switching elements Q5 to Q8 include the two semiconductor switching elements Q5 and Q7 that are driven by the separate driving portions 12d and 12e and the two semiconductor switching elements Q6 and Q8 that are driven by the same driving portion 12f. With this configuration, the semiconductor switching elements Q1 to Q8 of the DAB bidirectional DC-DC converter can be driven with the six driving portions 12a to 12f.

Second Embodiment

Figure 3:
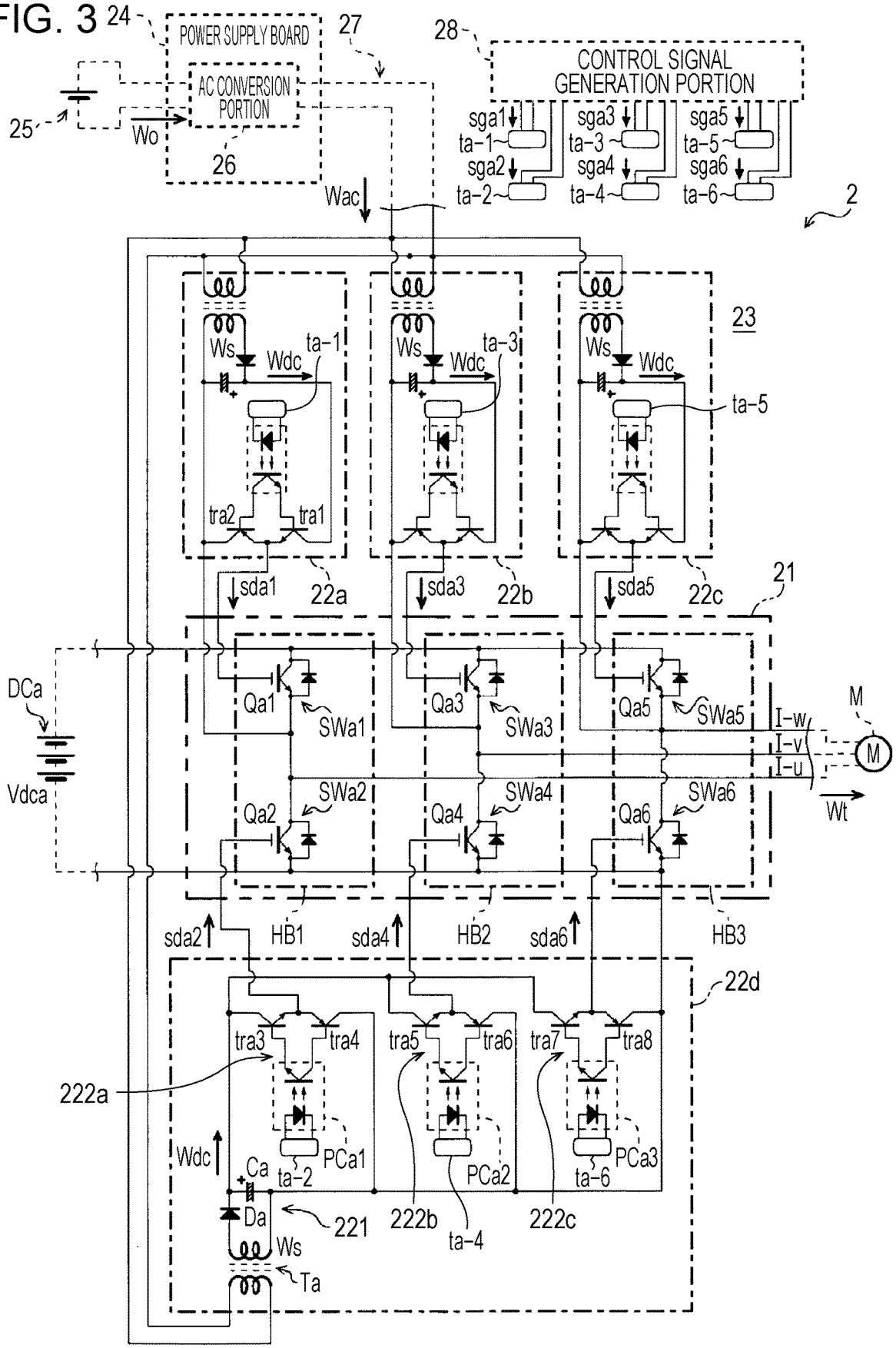
FIG. 3 shows a circuit which is mounted on a power control board of a power conversion apparatus according to a second embodiment.

A second embodiment will next be described. FIG. 3 shows a circuit which is mounted on a power control board 23 of a power conversion apparatus 2 according to the second embodiment. Note that electrical connections of constituent elements arranged outside the power control board 23 are indicated by broken lines. In the second embodiment, same constituent elements as those in the first embodiment are denoted by same reference characters, and a description thereof may be omitted.

The power conversion apparatus 2 is an AC power supply apparatus which is provided between a DC power supply DCa and a motor M, and converts DC power output from the DC power supply DCa into three-phase AC power Wt, and outputs the three-phase AC power Wt to the motor M. Note that the three-phase AC power Wt has three-phase (U-phase, V-phase, and W-phase) AC components I-u, I-v, and I-w which are 120 degrees out of phase with one another.

As shown in FIG. 3, the power conversion apparatus 2 includes a power conversion circuit portion 21, a plurality of gate driving portions 22a to 22d, a power control board 23, a power supply board 24, a DC power source 25, an AC conversion portion 26, transmission lines 27, and a control signal generation portion 28. The power control board 23 has the power conversion circuit portion 21 and the plurality of gate driving portions 22a to 22d mounted thereon. The power supply board 24 has the AC conversion portion 26 mounted thereon. Two transmission lines 27 are provided between the power control board 23 and the power supply board 24. For this reason, it is easy to increase or decrease the number of gate driving portions 22a to 22d in accordance with the number of motors M arranged, and the like. Note that, in FIG. 3, connection ends ta-1 to ta-6 of the control signal generation portion 28 are respectively connected to connection ends ta-1 to ta-6 of light-emitting elements of photocouplers in the gate driving portions 22a to 22c and photocouplers PCa1 to PCa3 in the gate driving portion 22d. In the second embodiment, the gate driving portions 22a to 22d are each an example of a "driving portion" of the present disclosure. The configurations of the DC power source 25, the AC conversion portion 26, and the transmission line 27 of the second embodiment are the same as those of the DC power source 15, the AC conversion portion 16, and the transmission line 17 of the first embodiment, and a description thereof will be omitted.

Figure 4:
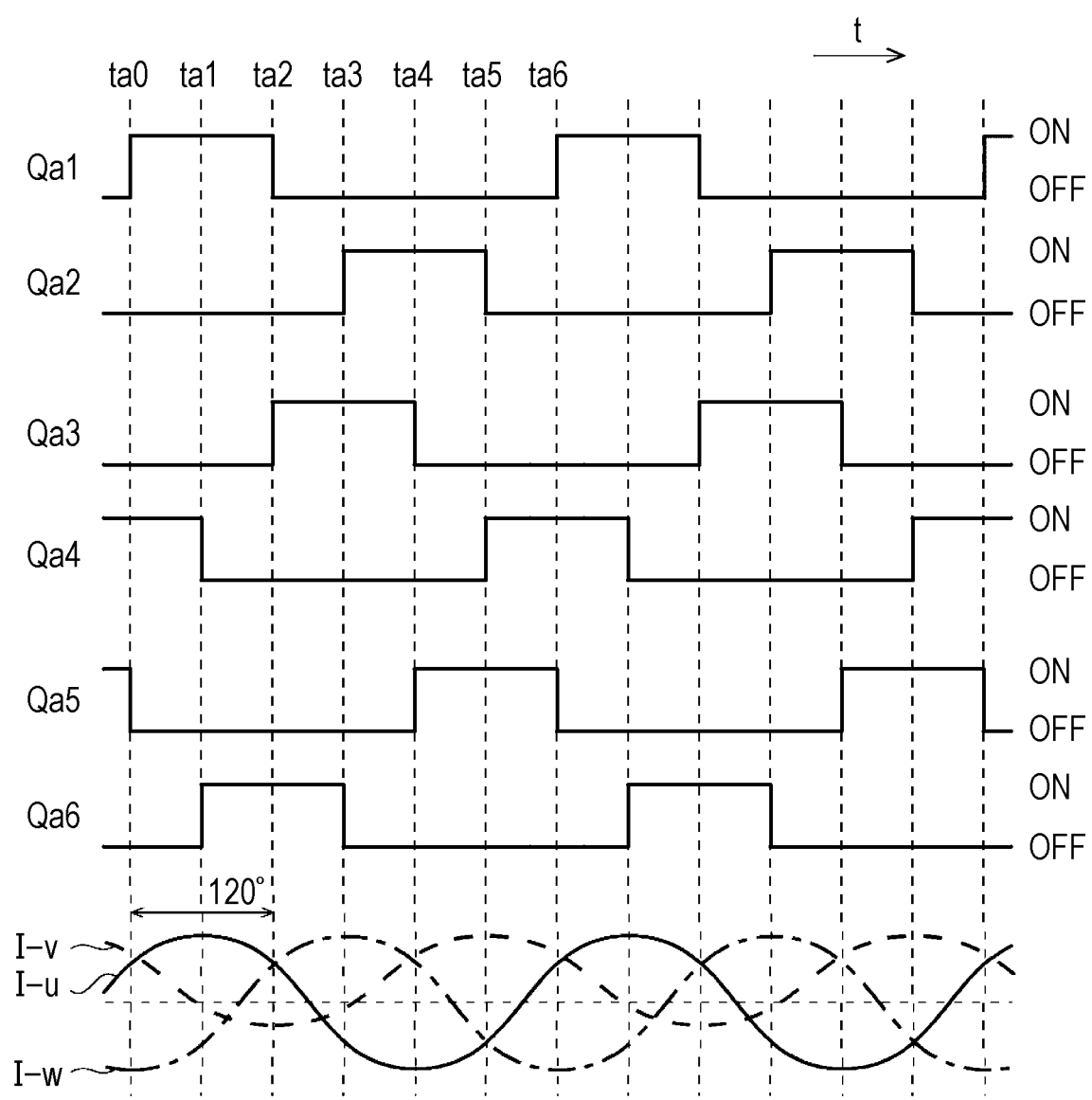
FIG. 4 is a timing diagram of turning-on and turning-off of PWM driving of semiconductor switching elements according to the second embodiment and AC components of three-phase AC power.

The power conversion circuit portion 21 is connected to the DC power supply DCa and the motor M. As shown in FIG. 3, the power conversion circuit portion 21 includes six semiconductor switching elements Qa1 to Qa6. FIG. 4 is a timing diagram of turning-on and turning-off of pulse width modulation (PWM) driving of the semiconductor switching elements Qa1 to Qa6 according to the second embodiment and the AC components I-u, I-v, and I-w of the three-phase AC power Wt. Note that a dead time at each of time points ta1 to ta6 is omitted in FIG. 4.

As shown in FIG. 4, the power conversion circuit portion 21 PWM-drives the semiconductor switching elements Qa1 to Qa6 in accordance with gate driving PWM signals sda1 to sda6 (to be described later) which are input from the gate driving portions 22a to 22d, thereby converting power from the DC power supply DCa into the three-phase AC power Wt. The power conversion circuit portion 21 then outputs the three-phase AC power Wt to the motor M.

The power conversion circuit portion 21 includes three half-bridge circuits HB1 to HB3. The half-bridge circuits HB1 to HB3 generate one-phase AC components of three phases different from one another. More specifically, the first half-bridge circuit HB1 generates the AC component I-u of U-phase from power from the DC power supply DCa, for example. The second half-bridge circuit HB2 generates the AC component I-v of V-phase from the power from the DC power supply DCa. The third half-bridge circuit HB3 generates the AC component I-w of W-phase from the power from the DC power supply DCa.

One ends of the half-bridge circuits HB1 to HB3 are connected to the DC power supply DCa, and the other ends are connected to the motor M. More specifically, the half-bridge circuits HB1 to HB3 are composed of the respective semiconductor switching elements Qa1, Qa3, and Qa5 on one side and the respective semiconductor switching elements Qa2, Qa4, and Qa6 on the other side. Note that the semiconductor switching elements Qa1, Qa3, and Qa5 on the one side are connected in series to the respective semiconductor switching elements Qa2, Qa4, and Qa6 on the other side. The semiconductor switching elements Qa1, Qa3, and Qa5 on the one side are driven by the separate gate driving portions 22a, 22b, and 22c, and the semiconductor switching elements Qa2, Qa4, and Qa6 on the other side are driven by the same gate driving portion 22d. Thus, the semiconductor switching elements Qa1 to Qa6 of the power conversion apparatus 2 are driven by the four gate driving portions 22a to 22d.

One ends of the semiconductor switching elements Qa1, Qa3, and Qa5 on the one side are connected to one another and are connected to one end of the DC power supply DCa. One ends of the semiconductor switching elements Qa2, Qa4, and Qa6 on the other side are connected to one another and are connected to the other end of the DC power supply DCa. A U-phase terminal (not shown), a V-phase terminal (not shown), and a W-phase terminal (not shown) of the motor M are connected between the other ends of the semiconductor switching elements Qa1, Qa3, and Qa5 on the one side and the other ends of the semiconductor switching elements Qa2, Qa4, and Qa6 on the other side.

The semiconductor switching elements Qa1 to Qa6 together with respective flyback diodes connected in parallel constitute switch portions SWa1 to SWa6, respectively. The semiconductor switching elements Qa1 to Qa6 are each, for example, an IGBT. In the switch portions SWa1 to SWa6, anodes of the flyback diodes are connected to drains of the semiconductor switching elements Qa1 to Qa6, and cathodes of the flyback diodes are connected to sources of the semiconductor switching elements Qa1 to Qa6.

The gate driving portions 22a to 22d are connected to gates of the semiconductor switching elements Qa1 to Qa6, and the gate driving PWM signals sda1 to sda6 are input from the gate driving portions 22a to 22d. Turning-on and turning-off (that is, opening and closing operation) of the semiconductor switching elements Qa1 to Qa6 is controlled in accordance with the gate driving PWM signals sda1 to sda6.

The gate driving portions 22a to 22d then drive the semiconductor switching elements Qa1 to Qa6 with the gate driving PWM signals sda1 to sda6.

The configurations of the gate driving portions 22a to 22c of the second embodiment are the same as those of the gate driving portions 12a to 12c according to the first embodiment. In the gate driving portions 22a to 22c, the gates of the semiconductor switching elements Qa1, Qa3, and Qa5 are connected between emitters of transistor elements tra1 and collectors of transistor elements tra2. The gate driving portions 22a to 22c generate the gate driving PWM signals sda1, sda3, and sda5 in accordance with control signals sga1, sga3, and sga5 input from the control signal generation portion 28 via the connection ends ta-1, ta-3, and ta-5 and output the gate driving PWM signals sda1, sda3, and sda5 to the semiconductor switching elements Qa1, Qa3, and Qa5.

The gate driving portion 22d includes a gate power supply circuit portion 221 and three gate drivers 222a to 222c. Note that, in the second embodiment, the gate power supply circuit portion 221 is an example of a "power supply portion" of the present disclosure and that the gate drivers 222a to 222c are each an example of a "driving signal generation portion" of the present disclosure. The gate power supply circuit portion 221 is an isolated power supply which supplies, to the gate drivers 222a to 222c, DC power-supply power Wdc for generating the gate driving PWM signals sda2, sda4, and sda6. AC power-supply power Wac is input from outside the power control board 23 to the gate power supply circuit portion 221. The gate power supply circuit portion 221 converts the AC power-supply power Wac into the DC power-supply power Wdc. The gate power supply circuit portion 221 then outputs the DC power-supply power Wdc to the gate drivers 222a to 222c.

In the above-described manner, the AC power-supply power Wac for generating the gate driving PWM signals sda1 to sda6 is input from outside the power control board 23 to the gate power supply circuit portions 221 of the gate driving portions 22a to 22d and is converted into the DC power-supply power Wdc in the vicinity of the semiconductor switching elements Qa1 to Qa6. It is thus possible to easily secure separation distances sufficient to achieve good electrical isolation, such as galvanic isolation, between the gate power supply circuit portions 221 of the gate driving portions 22a to 22d while curbing an increase in a board area of the power control board 23. The separation distances between the gate power supply circuit portions 221 of the gate driving portions 22a to 22d can be shortened, which allows miniaturization of the power conversion apparatus 2.

Since the gate driving portions 22a to 22d and the power conversion circuit portion 21 are mounted on the same power control board 23, output signal lines of the gate driving portions 22a to 22d need not be connected to the power conversion circuit portion 21 using, for example, a harness in which connecting lines are closely bound. Accordingly, sufficient separation distances can be easily secured between the output signal lines of the gate driving portions 22a to 22d. It is thus possible to inhibit or keep output signals from the gate driving portions 22a to 22d from interfering with one another.

The gate power supply circuit portion 221 includes an isolation transformer Ta, a diode Da, and a capacitor Ca. The AC power-supply power Wac is input to a primary-side terminal of the isolation transformer Ta. Secondary-side power Ws based on the AC power-supply power Wac is generated at a secondary-side terminal of the isolation transformer Ta. The gate power supply circuit portion 221 converts the secondary-side power Ws output from the secondary-side terminal of the isolation transformer Ta into the DC power-supply power Wdc of direct current with the diode Da and the capacitor Ca. Since the gate power supply circuit portion 221 includes the isolation transformer Ta, an input end and an output end of the gate power supply circuit portion 221 in the gate driving portion 22d can be isolated from each other.

The gate drivers 222a to 222c include the photocouplers PCa1 to PCa3 and transistor elements tra3 and tra4, tra5 and tra6, and tra7 and tra8, respectively. The gate drivers 222a to 222c generate the gate driving PWM signals sda2, sda4, and sda6, respectively, from the DC power-supply power Wdc in accordance with control signals sga2, sga4, and sga6 (to be described later) output from the control signal generation portion 28 via the connection ends ta-2, ta-4, and ta-6.

In the gate driving portion 22d, the primary-side terminal of the isolation transformer Ta is connected to the transmission lines 27. One end of the secondary-side terminal of the isolation transformer Ta is connected to an anode of the diode Da. A cathode of the diode Da is connected to a high-potential-side terminal of the capacitor Ca and collectors of the transistor elements tra3, tra5, and tra7. The other end of the secondary-side terminal of the isolation transformer Ta is connected to a low-potential-side terminal of the capacitor Ca and emitters of the transistor elements tra4, tra6, and tra8 and is further connected to the power conversion circuit portion 21. Note that, more specifically, the other end is connected to the one ends of the semiconductor switching elements Qa2, Qa4, and Qa6 of the half-bridge circuits HB1 to HB3 and the other end of the DC power supply DCa. The photocoupler PCa1 is connected to bases of the transistor elements tra3 and tra4, the photocoupler PCa2 is connected to bases of the transistor elements tra5 and tra6, and the photocoupler PCa3 is connected to bases of the transistor elements tra7 and tra8. An emitter of the transistor element tra3 is connected to a collector of the transistor element tra4 and the gate of the semiconductor switching element Qa2 in the first half-bridge circuit HB1. An emitter of the transistor element tra5 is connected to a collector of the transistor element tra6 and the gate of the semiconductor switching element Qa4 in the second half-bridge circuit HB2. An emitter of the transistor element tra7 is connected to a collector of the transistor element tra8 and the gate of the semiconductor switching element Qa6 in the third half-bridge circuit HB3. The control signals sga2, sga4, and sga6 are input from the control signal generation portion 28 to light-emitting elements of the photocouplers PCa1 to PCa3 via the connection ends ta-2, ta-4, and ta-6. The light-emitting elements of the photocouplers PCa1 to PCa3 are driven to emit light during a period when the semiconductor switching elements Qa2, Qa4, and Qa6 are on and are stopped from emitting light during a period when the semiconductor switching elements Qa2, Qa4, and Qa6 are off, in accordance with the control signals sga2, sga4, and sga6. With this configuration, the gate driving PWM signals sda2, sda4, and sda6 are generated from the secondary-side power Ws of alternating current, and the gate driving PWM signals sda2, sda4, and sda6 are output to the gates of the semiconductor switching elements Qa2, Qa4, and Qa6.

The control signal generation portion 28 generates the control signals sga1 to sga6 for controlling turning-on and turning-off of the semiconductor switching elements Qa1 to Qa6. The control signal generation portion 28 outputs the control signals sga1, sga3, and sga5 to the photocouplers, respectively, of gate drivers in the gate driving portions 22a to 22c via the connection ends ta-1, ta-3, and ta-5 and outputs the control signals sga2, sga4, and sga6 to the photocouplers PCa1 to PCa3, respectively, of the gate drivers 222a to 222c in the gate driving portion 22d via the connection ends ta-2, ta-4, and ta-6. Note that although the control signal generation portion 28 is provided at the power conversion apparatus 2 in FIG. 3, the present disclosure is not limited to the example. The control signal generation portion 28 may be provided outside the power conversion apparatus 2.

According to the present embodiment described above, the power conversion apparatus 2 is configured to include the power conversion circuit portion 21 that includes the plurality of semiconductor switching elements Qa1 to Qa6, the control signal generation portion 28 that generates the control signals sga1 to sga6 for controlling opening and closing (turning-on and turning-off) of the semiconductor switching elements Qa1 to Qa6, the plurality of driving portions 22a to 22d that drive the semiconductor switching elements Qa1 to Qa6, and the first board 23 on which the power conversion circuit portion 21 and the plurality of driving portions 22a to 22d are mounted, and configured such that each of the driving portions 22a to 22d includes power supply portions of the driving portions 22a to 22c and the power supply portion 221 of the driving portion 22d that convert the AC power-supply power Wac input from outside the first board 23 into the DC power-supply power Wdc and driving signal generation portions of the driving portions 22a to 22c and the driving signal generation portions 222a to 222c of the driving portion 22d that generate the driving signals sda1 to sda6 for driving the semiconductor switching elements Qa1 to Qa6 from the DC power-supply power Wdc in accordance with the control signals sga1 to sga6.

According to the above-described configuration, the AC power-supply power Wac for generating the driving signals sda1 to sda6 is input from outside the first board 23 to the power supply portions of the driving portions 22a to 22c and the power supply portion 221 of the driving portion 22d and is converted into the DC power-supply power Wdc in the vicinity of the semiconductor switching elements Qa1 to Qa6. It is thus possible to easily secure separation distances sufficient to achieve good electrical isolation, such as galvanic isolation, between the power supply portions (that is, the power supply portions of the driving portions 22a to 22c and the power supply portion 221 of the driving portion 22d) while curbing an increase in the board area of the first board 23. Additionally, the power conversion apparatus 2 can be miniaturized.

Additionally, since the driving portions 22a to 22d and the power conversion circuit portion 21 are mounted on the same first board 23, the output signal lines of the driving portions 22a to 22d need not be connected to the power conversion circuit portion 21 using, for example, a harness in which connecting lines are closely bound. Accordingly, sufficient separation distances can be easily secured between the output signal lines of the driving portions 22a to 22d. It is thus possible to inhibit or keep output signals from the driving portions 22a to 22d from interfering with one another.

Moreover, according to the present embodiment, the power conversion apparatus 2 may be the power conversion apparatus 2 that converts power from the third DC power supply DCa into the three-phase AC power Wt. The power conversion apparatus 2 may be configured such that the power conversion circuit portion 21 includes the first half-bridge circuit HB1 that generates the AC component I-u of U-phase (a first phase) of the three phases from power from the third DC power supply DCa, the second half-bridge circuit HB2 that generates the AC component I-v of V-phase (a second phase different from the first phase) of the three phases from the power from the third DC power supply DCa, and the third half-bridge circuit HB3 that generates the AC component I-w of W-phase (a third phase different from the first and second phases) of the three phases from the power from the third DC power supply DCa, and the first half-bridge circuit HB1, the second half-bridge circuit HB2, and the third half-bridge circuit HB3 include the two semiconductor switching elements Qa1 and Qa2, the two semiconductor switching elements Qa3 and Qa4, and the two semiconductor switching elements Qa5 and Qa6, respectively. With this configuration, the power conversion apparatus 2 that generates the three-phase AC power Wt to be generated by the first to third half-bridge circuits HB1 to HB3 can be provided as an AC power supply apparatus.

Furthermore, according to the present embodiment, the power conversion apparatus 2 may be configured such that the semiconductor switching elements Qa1, Qa3, and Qa5 on the one side are driven by the separate driving portions 22a, 22b, and 22c while the semiconductor switching elements Qa2, Qa4, and Qa6 on the other side are driven by the same driving portion 22d, in the first half-bridge circuit HB1, the second half-bridge circuit HB2, and the third half-bridge circuit HB3. With this configuration, the semiconductor switching elements Qa1 to Qa6 of the power conversion apparatus 2 that functions as an AC power supply apparatus can be driven with the four driving portions 22a to 22d.

The embodiments of the present disclosure have been described above. Note that the above-described embodiments are illustrative. It is understood by those skilled in the art that various modifications can be made to combinations of constituent elements and processes and are included in the scope of the present disclosure.

The present disclosure is applied to a DC-DC converter in the first embodiment and is applied to an AC power supply apparatus in the second embodiment. The present disclosure, however, is not limited to the examples. The present disclosure is useful to apparatuses equipped with the power conversion apparatuses 1 and 2.

The present disclosure contains subject matter related to that disclosed in Japanese Priority Patent Application JP 2017-201628 filed in the Japan Patent Office on Oct. 18, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A power conversion apparatus comprising:
   a power conversion circuit portion including a plurality of semiconductor switching elements;
   a control signal generation portion generating a control signal for controlling opening and closing of each of the semiconductor switching elements;
   a plurality of driving portions driving the semiconductor switching elements; and
   a first board on which the power conversion circuit portion and the plurality of driving portions are mounted, wherein
   each of the driving portions includes
      a power supply portion converting AC power supply power input from outside the first board into DC power-supply power, and
      a driving signal generation portion generating a driving signal for driving the semiconductor switching elements from the DC power-supply power in accordance with the control signal, and
   wherein the power supply portion in each of the driving portions includes a first isolation transformer which receives the AC power-supply power input to a primary-side terminal and converts secondary-side power output from a secondary-side terminal of the first isolation transformer into the DC power-supply power of direct current.

2. The power conversion apparatus according to claim 1, further comprising:
   an AC conversion portion converting output power from a DC power source into the AC power-supply power; and
   a second board on which the AC conversion portion is mounted.

3. The power conversion apparatus according to claim 2, further comprising:
   transmission lines transmitting the AC power-supply power, wherein the number of transmission lines which are provided between the first board and the second board is two.

4. The power conversion apparatus according to claim 1, wherein the power conversion apparatus is a power conversion apparatus which transmits power between a first DC power supply and a second DC power supply in two directions, the plurality of semiconductor switching elements includes a plurality of first semiconductor switching elements and a plurality of second semiconductor switching elements, the power conversion circuit portion includes
- a first full-bridge circuit which includes the plurality of first semiconductor switching elements and a first capacitor,
- a second full-bridge circuit which includes the plurality of second semiconductor switching elements and a second capacitor, and
- a second isolation transformer, the first full-bridge circuit has one end connected to the first DC power supply and the other end connected to a one-side winding of the second isolation transformer, and the second full-bridge circuit has one end connected to an other-side winding of the second isolation transformer and the other end connected to the second DC power supply.

5. The power conversion apparatus according to claim 4, wherein the plurality of first semiconductor switching elements includes
- two of the semiconductor switching elements which are driven by separate ones of the driving portions, and
- two of the semiconductor switching elements which are driven by a same one of the driving portions, and the plurality of second semiconductor switching elements includes
- two of the semiconductor switching elements which are driven by separate ones of the driving portions, and
- two of the semiconductor switching elements which are driven by a same one of the driving portions.

6. The power conversion apparatus according to claim 1, wherein the power conversion apparatus is a power conversion apparatus which converts power from a third DC power supply into AC power of three phases, the power conversion circuit portion includes
- a first half-bridge circuit which generates an AC component of a first phase of the three phases from the power from the third DC power supply,
- a second half-bridge circuit which generates an AC component of a second phase different from the first phase of the three phases from the power from the third DC power supply, and
- a third half-bridge circuit which generates an AC component of a third phase different from the first and second phases of the three phases from the power from the third DC power supply, and the first half-bridge circuit, the second half-bridge circuit, and the third half-bridge circuit each include two of the semiconductor switching elements.

7. The power conversion apparatus according to claim 6, wherein in the first half-bridge circuit, the second half-bridge circuit, and the third half-bridge circuit, the semiconductor switching elements on one side are driven by separate ones of the driving portions, and the semiconductor switching elements on the other side are driven by a same one of the driving portions.

* * * * *